(12) United States Patent
Moghimi et al.

(10) Patent No.: US 10,923,738 B2
(45) Date of Patent: Feb. 16, 2021

(54) COOLANT INJECTION CONTROLLER (71) Applicant: Intelligent Energy Limited, Loughborough (GB)

(72) Inventors: Shahin Moghimi, Loughborough (GB); Vince Gardner, Loughborough (GB); Nathaniel Palmer, Loughborough (GB); Simon Foster, Loughborough (GB); Pratap Rama, Loughborough (GB)

(73) Assignee: Intelligent Energy Limited, Loughborough (GB)

( * ) Notice: Subject to any disclaimer, the term of this patent is extended or adjusted under 35 U.S.C. 154(b) by 807 days.

(21) Appl. No.: 15/529,974

(22) PCT Filed: Nov. 26, 2015

(86) PCT No.: PCT/GB2015/053605
§ 371 (c)(1),
(2) Date: May 25, 2017

(87) PCT Pub. No.: WO2016/083813
PCT Pub. Date: Jun. 2, 2016

(65) Prior Publication Data
US 2017/0309929 A1 Oct. 26, 2017

(30) Foreign Application Priority Data
Nov. 27, 2014 (GB) ..................................... 1421051

(51) Int. Cl.
*H01M 8/0258* (2016.01)
*H01M 8/04537* (2016.01)
(Continued)

(52) U.S. Cl.
CPC ....... *H01M 8/0258* (2013.01); *H01M 8/0267* (2013.01); *H01M 8/0432* (2013.01);
(Continued)

(58) Field of Classification Search
CPC combination set(s) only.
See application file for complete search history.

(56) References Cited

U.S. PATENT DOCUMENTS

2003/0003330 A1   1/2003  Ballantine et al.
2005/0260463 A1*  11/2005 Chapman .......... H01M 8/04179
                                                    429/432
(Continued)

FOREIGN PATENT DOCUMENTS

CN      102986071 A    3/2013
JP      H07-094202 A   4/1995
(Continued)

OTHER PUBLICATIONS

International Patent Application No. PCT/GB2015/053605; Int'l Preliminary Report on Patentability; dated Jun. 8, 2017; 9 pages.

*Primary Examiner* — Christopher P Domone
(74) *Attorney, Agent, or Firm* — BakerHostetler (57) ABSTRACT

A coolant injection controller for a fuel cell system, the coolant injection controller configured to actively control the flow of a coolant to a fuel cell assembly for cooling and/or hydrating the fuel cell assembly in response to a measure of fuel cell assembly performance, wherein the coolant injection controller is configured to provide for a first mode of operation if the measure of fuel cell assembly performance is below a predetermined threshold and a second mode of operation if the measure of fuel cell assembly performance is above the predetermined threshold, the first and second modes having different coolant injection profiles and wherein, in the first mode of operation, the coolant injection profile provides for control of the flow of coolant by alternating between at least two different injection flow rates.

9 Claims, 4 Drawing Sheets (51) Int. Cl.
*H01M 8/0432* (2016.01)
*H01M 8/04701* (2016.01)
*H01M 8/0267* (2016.01)
H01M 8/04828 (2016.01)
H01M 8/0438 (2016.01)

(52) U.S. Cl.
CPC ... *H01M 8/04328* (2013.01); *H01M 8/04335* (2013.01); *H01M 8/04358* (2013.01); *H01M 8/04537* (2013.01); *H01M 8/04552* (2013.01); *H01M 8/04619* (2013.01); *H01M 8/04701* (2013.01); *H01M 8/04723* (2013.01); *H01M 8/0494* (2013.01); *H01M 8/04417* (2013.01)

(56) References Cited

U.S. PATENT DOCUMENTS

| | | | |
|---|---|---|---|
| 2007/0231643 A1 | 10/2007 | Yamaga et al. | |
| 2008/0124591 A1* | 5/2008 | Darling | H01M 8/04059 |
| | | | 429/437 |
| 2008/0176122 A1 | 7/2008 | Wake et al. | |
| 2011/0070515 A1 | 3/2011 | Lee et al. | |
| 2011/0177416 A1* | 7/2011 | Suematsu | H01M 8/04358 |
| | | | 429/440 |
| 2014/0120440 A1* | 5/2014 | Nolan | H01M 8/04955 |
| | | | 429/431 |

FOREIGN PATENT DOCUMENTS

| | | |
|---|---|---|
| JP | H11-283653 A | 10/1999 |
| JP | 2005-276568 A | 10/2005 |
| JP | 2007-257976 A | 10/2007 |
| JP | 2008-282764 A | 11/2008 |
| JP | 2013-218923 A | 10/2013 |

* cited by examiner

COOLANT INJECTION CONTROLLER

This application is a U.S. National Stage Patent Application of International Patent Application No. PCT/GB2015/053605 filed Nov. 26, 2015, which claims priority to Great Britain patent application number 1421051.2 filed Nov. 27, 2014, the contents of which are incorporated herein in their entirety.

This invention relates to a method of operation of a fuel cell system comprising a fuel cell assembly and a coolant storage tank. The invention also relates to a fuel cell system including said fuel cell assembly and coolant storage tank.

Conventional electrochemical fuel cells convert fuel and oxidant into electrical energy and a reaction product. A common type of electrochemical fuel cell comprises a membrane electrode assembly (MEA), which includes a polymeric ion (proton) transfer membrane between an anode and a cathode and gas diffusion structures. The fuel, such as hydrogen, and the oxidant, such as oxygen from air, are passed over respective sides of the MEA to generate electrical energy and water as the reaction product. A stack may be formed comprising a number of such fuel cells arranged with separate anode and cathode fluid flow paths. Such a stack is typically in the form of a block comprising numerous individual fuel cell plates held together by end plates at either end of the stack.

It is important that the polymeric ion transfer membrane remains hydrated for efficient operation. It is also important that the temperature of the stack is controlled. Thus, coolant may be supplied to the stack for cooling and/or hydration. Accordingly a fuel cell system may include a water/coolant storage tank for storing water for hydration and/or cooling of the fuel cell stack, for example. If the fuel cell system is stored or operated in sub-zero conditions, the water in the fuel cell stack and water storage tank may freeze. The frozen water may cause blockages that hinder the supply of coolant or hydration water to the fuel cell stack. This is a particular problem when the fuel cell system is off and therefore water in the water storage tank is no longer heated by its passage through the stack and may freeze completely. In such an event sufficient liquid water may not be available for hydration and/or cooling. This may prevent the fuel cell assembly from being restarted or operating at full power until the frozen water has been thawed. It is known to provide a heater in the fuel cell system, which operates on stored energy, such as from a battery, and maintains the fuel cell system at above-zero temperatures to prevent freezing occurring. The battery power is, however, limited and the fuel cell system may experience freezing if the battery fails or becomes discharged.

We disclose a method of operating a fuel cell system comprising a fuel cell assembly configured to generate electrical power from a fuel flow and an oxidant flow, the method comprising a first phase and a subsequent second phase, the first phase comprising;
 operating the fuel cell assembly with a first stoichiometric ratio of oxidant flow to fuel flow to generate electrical power;
 providing said generated electrical power to a heater element for heating a coolant for supply to said fuel cell assembly;
 the second phase comprising;
 delivering coolant heated in the first phase to the fuel cell assembly;
 operating the fuel cell assembly with a second stoichiometric ratio of oxidant flow to fuel flow to generate electrical power, the second stoichiometric ratio lower than the first ratio.

This is an advantageous method for starting an evaporatively cooled fuel cell assembly (such as a fuel cell stack) in freezing conditions. The system typically includes a coolant storage module containing the liquid coolant, which can freeze in cold conditions. The first stoichiometric ratio may be chosen to cool the fuel cell assembly sufficiently that sufficient power can be generated for the assembly itself to power a heater to thaw the frozen coolant. The liquid coolant can then be delivered and the stoichiometric ratio reduced to improve efficiency and continue the thawing of coolant. The first phase is advantageous as it may provide conditions for operation of the fuel cell system and the thawing of a predetermined quantity of coolant prior to releasing the coolant into the fuel cell assembly. Maintaining thawed coolant in a coolant storage module while more coolant is thawed and the thawed coolant is further heated may be advantageous as the thawed coolant may be less likely to refreeze in the conduits leading to the assembly and may provide for a predetermined quantity of coolant to be available for reliable commencement of the second phase.

Optionally, the second phase includes the step of providing said generated electrical power to the heater element or a different heater element for heating a coolant for supply to said fuel cell assembly. This different heater element may be provided for activation in the second phase. This may be advantageous as the second heater element can be located in a different place in a coolant storage module for thawing a different region of frozen coolant. Alternatively, the same heater element may be activated in the second phase or a combination of a plurality of heater elements. The heater element or further heater elements may be an ohmic heater, combustion heater, heat pipe or heat exchanger that moves heat from a hotter part of the fuel cell system, such as oxidant flow compressors, to the colder water storage module.

Optionally, the method comprises providing at least part of said generated power to a load external to the fuel cell system only in said second phase. Thus, in the first phase, all available power in excess of that required to operate the fuel cell system (i.e. parasitic loads) may be provided to the heater element for thawing coolant. Alternatively a predetermined minimum share or minimum absolute amount of the generated power may be provided to the heater element. Thus, the thawing of coolant is made a priority in at least the first phase and possibly the second phase. If the heater element does not require all of the available power in the first phase, then it will be appreciated that excess power may be made available for other uses, such as powering the load, which may be a vehicle, or ancillary systems associated with the vehicle.

Optionally, the first phase includes setting a fuel flow supply pressure to a first pressure and the second phase comprises setting the fuel flow supply pressure to a second pressure higher than the first pressure.

Optionally, in said first phase, the step of operating the fuel cell system comprises operating the fuel cell system from an off-state, such that said first phase comprises a start-up phase of the fuel cell system. This method is particularly suited to start-up of a fuel cell system after experiencing freezing conditions while turned off.

Optionally, the method includes the step of determining a temperature of the fuel cell system and if the determined temperature is lower than a predetermined temperature, performing the first and second phases, and if the temperature is greater than the predetermined temperature operating the fuel cell system without providing power to the heater element. The method may be configured to utilise the water injection controller of the second aspect if the determined temperature is greater than the predetermined temperature. The temperature of the fuel cell system may be determined by measuring the temperature of the coolant, such as in a coolant storage module, or the temperature of the ambient environment surrounding the fuel cell system.

Optionally, the first phase ends and the second phase begins when one or more criteria are satisfied, the criteria including i) a predetermined quantity of liquid coolant is available for delivery to the fuel cell assembly, ii) a predetermined amount of electrical energy has been supplied to the heater element, iii) the heater element has been operating for predetermined time above a set-point voltage, iv) a temperature of oxidant flow through the fuel cell assembly, such as the cathode exhaust temperature, is above a predetermined oxidant temperature, v) a temperature of the fuel cell assembly, such as a housing or other external or internal part, is above a predetermined assembly temperature. These criteria (and potentially others) are indicative of fuel cell performance and the likely availability of coolant for provision to the fuel cell assembly in the second phase.

Optionally, in the first phase, the step of operating the fuel cell assembly comprises operating said assembly at a predetermined current output. The predetermined current output may comprise a current output lower than a maximum output of the fuel cell assembly.

Optionally, in the first phase, the step of operating the fuel cell assembly comprises progressively increasing the current output of the fuel cell assembly to meet the predetermined current output. A ramp up of the current output has been found to be effective at ensuring an adequate amount of power is provided to the heater element while maintaining electrical balance across the fuel cell assembly.

Optionally, the predetermined current output is modified and/or the progressive increase in current output is actively controlled based on a measure of fuel cell assembly performance. Optionally, the fuel cell assembly includes a plurality of fuel cells and the measure of fuel cell assembly performance comprises a minimum voltage of a fuel cell or group of fuel cells of the plurality of fuel cells that form the fuel cell assembly. Thus, the monitoring of fuel cell assembly performance in response to the current output required is monitored so as not to over burden the fuel cell assembly while it is not provided with coolant.

Optionally, following the supply of a predetermined amount of energy to the heater element during the first phase, and prior to a temperature of oxidant flow through the fuel cell assembly reaching a predetermined oxidant temperature, adjust the oxidant flow rate to achieve a maximum of the first stoichiometric ratio of oxidant flow to fuel flow and a predetermined minimum oxidant flow rate.

Optionally, during said second phase, the delivery of coolant to the fuel cell assembly comprises delivering said coolant at a first rate for a first period of time and subsequently delivering said coolant at a second rate lower than the first rate. The initial high flow rate is advantageous as it quickly primes the coolant line, hydrates and cools the fuel cell assembly. It will be appreciated that a third or further flow rates may be used.

Optionally, in the second phase, the second stoichiometric ratio is adopted after the delivery of coolant to the fuel cell assembly. Thus, cooling using the flow of oxidant is maintained until the liquid coolant is provided to the fuel cell assembly.

Optionally, during the first phase the fuel cell assembly is not provided with coolant. Thus, the first phase is focussed on melting a quantity of the coolant in a coolant storage module for delivery in the second phase.

Optionally, in the first phase, power generated by the fuel cell assembly is provided to an oxidant compressor for driving the oxidant into the fuel cell assembly. Thus, the stoichiometric ratio may be controlled by control of the compressor which is configured to drive air through cathode channels in the fuel cell assembly.

Optionally, in the second phase, the step of operating the fuel cell assembly comprises operating the fuel cell assembly at a greater power output than that during the first phase. Now that liquid coolant is available (albeit in smaller quantities than normal, for example, due to not all of the coolant being thawed), the fuel cell assembly can be operated at higher power output. This can assist with thawing the remaining frozen coolant.

Optionally, the second phase includes the step of providing said generated electrical power to the different heater element for heating the coolant for supply to said fuel cell assembly until the different heater element has been supplied with a predetermined amount of power and/or operated for a predetermined amount of time above a set-point voltage.

Optionally, the fuel cell assembly includes a plurality of fuel cells and during the second phase, the method includes the step of monitoring the voltage of the fuel cells in the assembly to determine a minimum voltage output by any one or group of the fuel cells to determine if the determined minimum voltage is below a predetermined minimum cell voltage and, if so, increasing a supply rate of the coolant to the fuel cell assembly. The method may include the step of determining whether a current flow rate of coolant to the fuel cell assembly is at a predetermined maximum value and/or whether there is coolant available in a coolant storage module and if either or both are true, reducing the load on the fuel cell assembly.

We disclose a fuel cell system comprising a fuel cell assembly configured to generate electrical power from a fuel flow and an oxidant flow and receive a liquid coolant for cooling the fuel cell assembly, the fuel cell system configured to operate in accordance with the above method.

Optionally, the fuel cell system includes a coolant storage module and the heater element is located in the coolant storage module. Optionally, the fuel cell system includes a coolant storage module which includes the heater element and a different heater element spaced from the heater element both located in the coolant storage module. The coolant storage module may comprises multiple compartments with the heater element and further heater element in different compartments. This limits the volume of frozen coolant any one heater element needs to melt.

It will be appreciated that the fuel cell system may include a controller configured to perform the method steps of the first aspect.

According to a further aspect we provide a computer program product including instructions for execution on a computing device having a processor and memory for performing the above method.

According to a first aspect of the invention, we provide a coolant injection controller for a fuel cell system, the coolant injection controller configured to actively control the flow of a coolant to a fuel cell assembly for cooling and/or hydrating the fuel cell assembly in response to a measure of fuel cell assembly performance.

The active control of the coolant supplied to the fuel cell assembly is advantageous as the coolant flow can be controlled to ensure reliability and efficiency of the fuel cell assembly.

Optionally, the measure of fuel cell assembly performance comprises a measure of the electrical output of the fuel cell assembly. The electrical output of the fuel cell assembly or individual or groups of fuel cell in the assembly has been found to be a good indicator of fuel cell assembly performance in relation to coolant supply.

Optionally, the measure of fuel cell assembly performance comprises a measure of the temperature of a reactant flow through the fuel cell assembly. In particular the reactant flow may comprise an exhaust flow, such as the cathode exhaust flow.

Optionally, the coolant injection controller is configured to provide for a first mode of operation if the measure of fuel cell assembly performance is below a predetermined threshold and a second mode of operation if the measure of fuel cell assembly performance is above the predetermined threshold, the first and second modes having different coolant injection profiles. This is advantageous as the invention provides for accurate control of coolant injection and can ensure an excess of coolant is not provided. However, it has been found that it may be difficult to measure low flow rates, such as required when the fuel cell assembly has a low output. Therefore, different coolant injection profiles can be used to maintain a level of accuracy.

Optionally, in the first mode of operation, the coolant injection profile provides for the injection of coolant that alternates between at least two different injection flow rates. Thus, the coolant may be pulsed into the fuel cell assembly using a high and a low flow rate.

Optionally, in the second mode of operation, the controller is configured to provide a coolant injection profile in which the coolant flow rate is progressively controlled in response to a measure of fuel cell assembly performance. The control may be proportional to the measure of fuel cell assembly performance or step-wise controlled.

Optionally, in the second mode of operation, the controller is configured to provide closed loop feedback to control the coolant flow rate in response to a measure of fuel cell assembly performance.

Optionally, in the second mode of operation, the controller is configured to progressively control the coolant flow rate based on a measure of the over-heating of the fuel cell assembly and/or low performance of the fuel cell assembly.

Optionally, the second mode of operation, the controller is configured to, in response to the coolant flow rate reaching a maximum threshold rate, reduce the electrical power output of the fuel cell assembly. Thus, if the flow of coolant cannot maintain the fuel cell performance within limits, the power output of the fuel cell assembly may be reduced.

According to a further aspect of the invention we provide a computer program or computer program product comprising instructions that, when executed on a processor, provide for the performance of the actions of the water injection controller.

There now follows, by way of example only, a detailed description of embodiments of the invention with reference to the following figures, in which.

The figures show a fuel cell system 1 comprising a fuel cell assembly 2 and a coolant storage module 3. The fuel cell assembly 2 in this example comprises a fuel cell stack including a plurality of proton exchange membrane fuel cells stacked together. The fuel cell assembly 2 comprises an evaporatively cooled fuel cell assembly. In this example, the coolant comprises water, although it will be appreciated that other coolants could be used such as glycol or aqueous solutions. The coolant or water storage module 3, in this example, stores pure water for the hydration and/or evaporative cooling of the fuel cell assembly 2.

In the event of freezing conditions, the water in the module 3 may freeze. The system 1 may not include or may not use an auxiliary heater to maintain an above-freezing temperature while the system 1 is powered down. On restarting the system 1, water may be required for cooling the fuel cell stack 2 and/or hydration of fuel cell membranes that form the fuel cells of the stack. Thus, if the water in the tank 1 is frozen, it must be thawed quickly so that it is available to the stack 3. The system disclosed does not require any external low voltage or high voltage supply and operates to make liquid coolant available under its own generated power. This is advantageous as the power required to melt the ice is generated by the assembly/stack itself rather than by draining a battery. It is known that batteries may experience low performance in cold temperatures and therefore using the fuel cell assembly power is beneficial.

Figure 1:
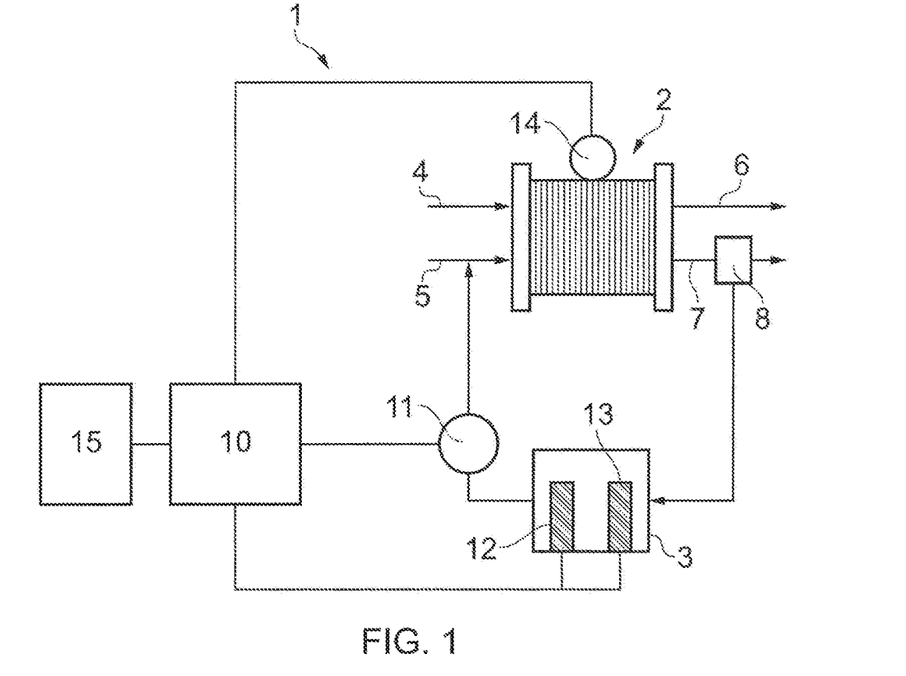
FIG. 1 shows a schematic diagram of an example fuel cell system.

The fuel cell assembly 2 is configured to receive a flow of fuel, such as hydrogen, through an anode inlet 4 and a flow of oxidant, such as air, through a cathode inlet 5. An anode exhaust 6 is provided to allow for through flow of the fuel. A cathode exhaust 7 is provided to allow for through flow of the oxidant. It will be appreciated that the exhaust flows also carry reaction by-products and any coolant/hydration liquid that may have passed through the assembly 2. The cathode exhaust 7 may include a coolant separator 8 to separate the coolant (water) from the cathode exhaust flow. The separated water is stored in the coolant storage module 3. It will be appreciated that while this example shows the recycling of water coolant that has passed through the stack, this invention is applicable to systems that do not recycle coolant or recycle coolant in a different way.

The coolant storage module 3 is connected to the fuel cell assembly by conduits, although it will be appreciated that the module 3 may be integrated with the fuel cells in the stack. The coolant storage module 3 is connected to the cathode inlet 5 to allow for the introduction of coolant into the cathode flow for evaporative cooling of the fuel cell assembly 2. The coolant may be introduced to the stack by a separate conduit.

A coolant injection controller 10 is provided to control the flow of coolant from the coolant storage module into the fuel cell assembly 2. The coolant injection controller 10 may provide control signals to a pump 11 to control the delivery of water to the fuel cell assembly 2. The controller 10 may also control heater elements 12, 13 located in the coolant storage module 3. The controller 10 may also receive one or more measures of the performance of the fuel cell assembly 2 by way of one or more sensors 14.

The heater elements 12, 13 comprise a first heater element 12 and a second heater element 13 spaced from the first. The coolant storage module 3 may comprise a plurality of coolant storage tanks configured to supply coolant to the fuel cell assembly and each having one or more heater elements. The one or more heater elements may be electrically powered or combustion energy powered. Further, they may comprise a heat dissipating element which may include a heat pipe or heat exchanger that moves heat from one part of the fuel cell system to another. For example, the compressors that drive oxidant through the fuel cell assembly can get warm relatively quickly after start-up of the fuel cell assembly and therefore moving heat from the compressors to the coolant storage module using a heat exchanger and working fluid and/or heat pipe may be advantageous.

The coolant injection controller 10 may form part of a fuel cell system controller 15 for controlling further operations of the fuel cell system.

Figure 2:
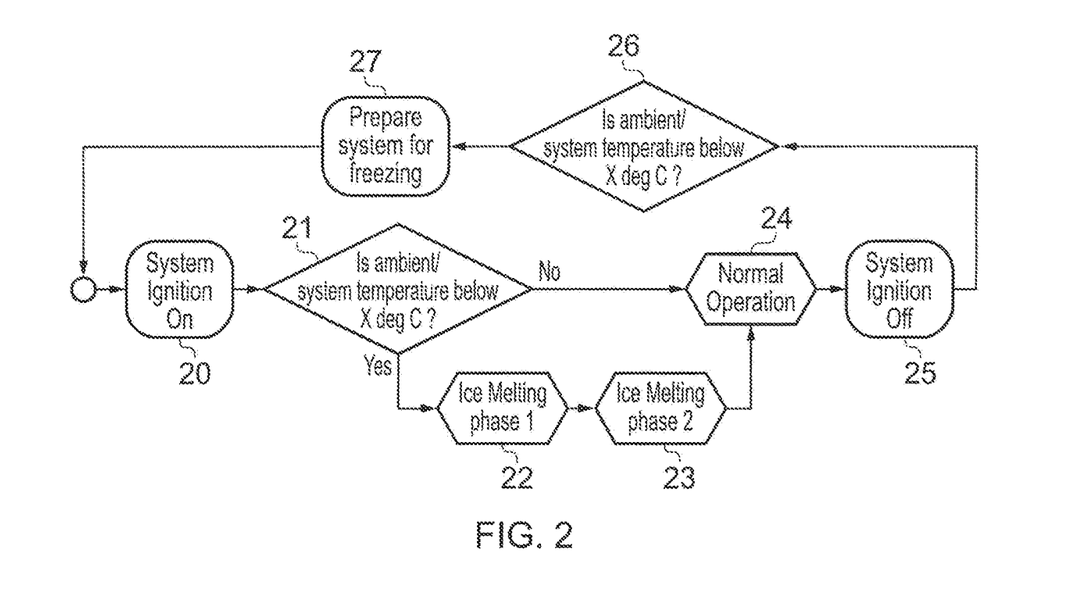
FIG. 2 shows a first flow chart illustrating a method of operation of the fuel cell system.

Turning to FIG. 2, an example method of operation of the fuel cell system 1 is shown. The method may be performed by the fuel cell system controller 15. The method of operation is performed to enable the fuel cell system to effectively start when used in cold or freezing ambient conditions. In cold or freezing ambient conditions there is a risk that coolant required by the fuel cell assembly 2 may not be available because it is frozen in the coolant storage module 3. It is important for the fuel cell system to identify when there may be a risk of freezing and modify its operation accordingly to enable reliable start-up of the fuel cell system. This is particularly important when the fuel cell system 1 provides the motive power for a vehicle. A user of the vehicle will expect the fuel cell system to reliably start and be able to provide effective power for the vehicle in a wide range of operating environments. This is a challenge given that resources, such as coolant, that are required by the fuel cell assembly for efficient operation may not be, at least initially, available for use.

FIG. 2 shows the step 20 of turning the fuel cell system 1 on to operate the fuel cell assembly 2. This may include powering up of electrical systems such as controllers 10, 15 to start the fuel cell assembly 2. This may initiate a supply of fuel and oxidant to the fuel cell assembly 2 by the inlets 4, 5 or this may be performed after step 21 discussed below. As discussed later, the relative flow rates of the fuel and oxidant may be controlled to achieve a particular stoichiometric ratio.

Step 21 shows the determination of the temperature of the fuel cell system 1. Thus, the fuel cell system controller 15 may use a temperature sensor(s) 14 to determine the temperature at one or more locations around the fuel cell system, such as in the stack or water storage module 3 and/or the ambient environment around the system 1. The determined temperature or a minimum or maximum or average of a plurality of temperature measurements are compared to a predetermined temperature threshold to determine the risk of coolant being frozen. In this embodiment, the predetermined temperature threshold is set at a temperature less than 10° C. If the determined temperature is lower than the predetermined temperature the method proceeds to operate the fuel cell system using a two phase method represented by steps 22 and 23, before entering a normal operation mode, which will be discussed in more detail below. If the measured temperature is greater than or equal to the predetermined temperature, the fuel cell system is operated in a "normal operation mode" represented by step 24. In the normal operation mode, the fuel cell system may not provide power to the heater elements 12, 13, but this will be discussed in more detail below. It will be appreciated that the predetermined temperature may be 0, 1, 2, 3, 4, 5, 6, 7° C. or some other value related to the freezing point of the coolant or other freezable resources the fuel cell system requires.

Step 25 represents shut-down of the fuel cell system, such as stopping the supply of fuel and oxidant. Step 26 represents the fuel cell system controller 15 determining, using the temperature sensor(s), the temperature of the fuel cell system and/or the ambient environment around the system 1. If the detected temperature is below the temperature threshold or a different temperature threshold then a cold-shut down operation is performed represented by step 27. In a further embodiment the controller 15 may be configured to retrieve a weather forecast, by using the Internet, to determine the potential ambient temperature and the system 1 may determine whether or not to perform the cold shut-down routine 27 based on the forecast. The routine 27 may comprise activating a compressor (not shown) to blow (with air or a purge gas) any coolant or water remaining in the fuel cell assembly 2 out of the assembly 2 and possibly into the coolant storage module 3. The method then awaits restarting of the fuel cell system 1.

Figure 3:
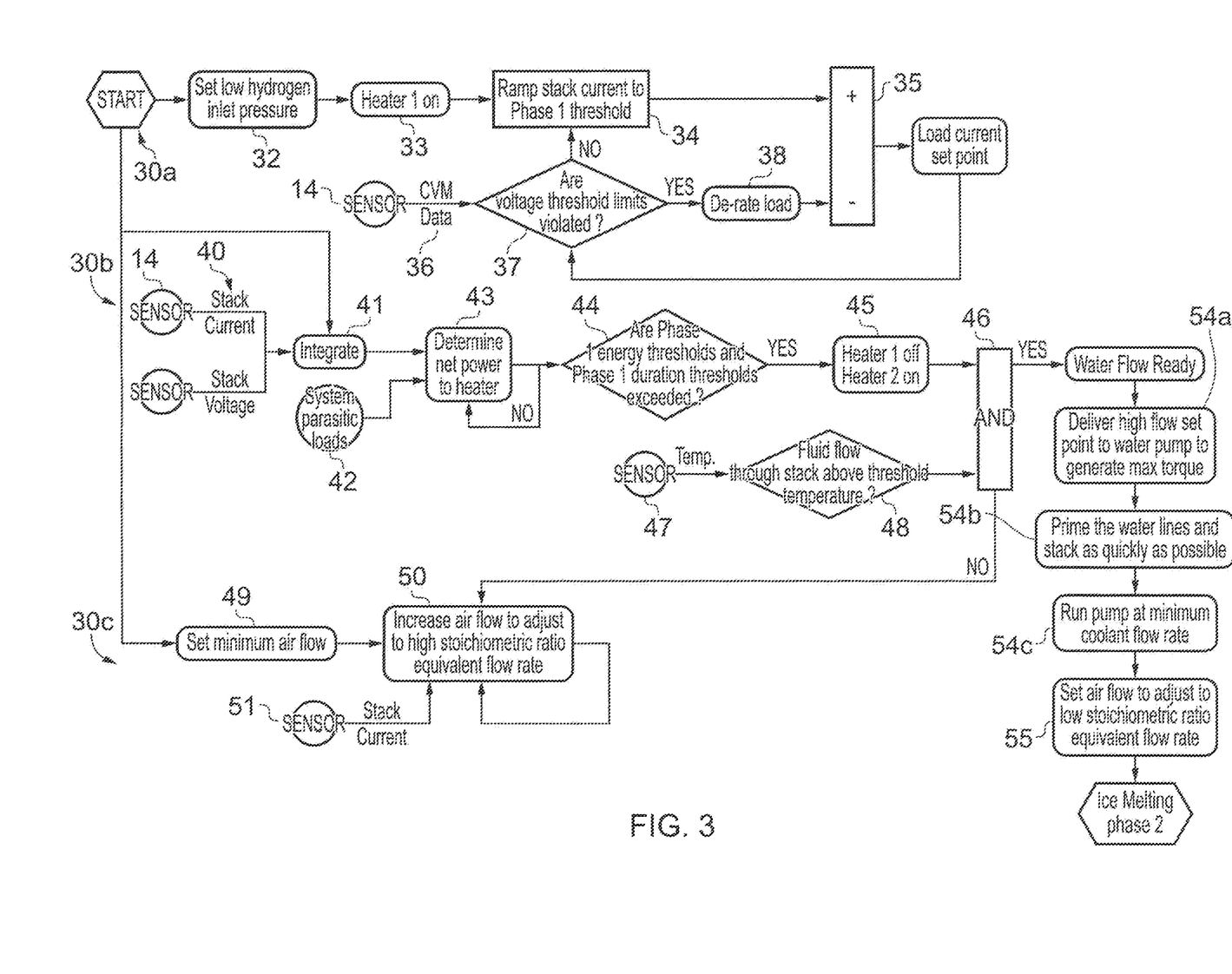
FIG. 3 shows a second flow chart illustrating a method of operation of the fuel cell system.
Figure 4:
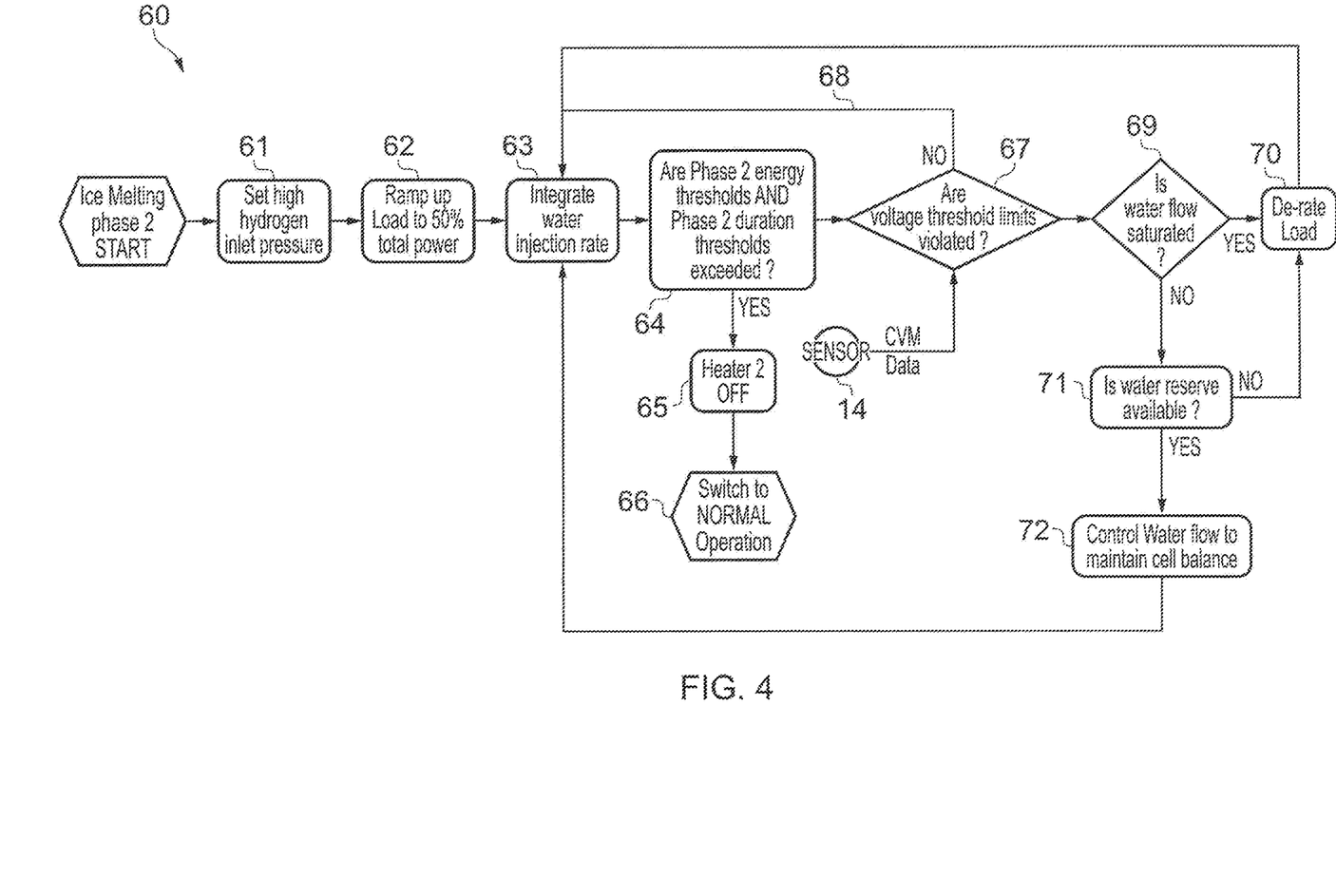
FIG. 4 shows a third flow chart illustrating a method of operation of the fuel cell system.

FIGS. 3 and 4 show in more detail the two phase method represented by steps 22 and 23 of FIG. 2.

FIG. 3 shows three processes 30a, 30b and 30c that occur simultaneously. The first process 30a comprises, in general, the incremental increase in fuel cell assembly 2 electrical output on start-up of the fuel cell system 1. The electrical output may comprise the current output by the assembly 2. The electrical output of the fuel cell system is therefore increased from zero (when turned off) to a predetermined current output, which may be below the maximum power output of the fuel cell assembly 2. The predetermined output may be below 70, 60, 50, 40, 30, 20 or 10% of the assembly's maximum output power or output current. In this example a predetermined output current threshold is used. During the progressive increase to the predetermined current output the performance of the fuel cell may be measured to determine if the incremental increase to the predetermined current output or other desired power output can be maintained.

Thus, on starting the fuel cell system 1, the fuel inlet pressure applied to the inlet 4 is set to a predetermined value as shown at step 32. In this example, the hydrogen fuel inlet pressure is set to a predetermined, first pressure of between 0.1 and 0.8 bar gauge, which may be selected by experiment as sufficient to provide for the power requirements of the first phase. The fuel inlet pressure may be lower than that used for normal operating conditions (i.e. when the operating temperature of the fuel cell system is greater than the above temperature threshold, for example).

The controller 15 or water injection controller 10 may then activate the first heater 12 using power from the fuel cell assembly, as represented by step 33. The heater 12 will thereby heat the coolant in the coolant module 3, which may include melting frozen coolant.

The incremental increase in fuel cell assembly 2 electrical output is shown by step 34 and control block 35. The progressive increase in electrical output may be achieved in many ways as will be known to those skilled in the art, such as increasing fuel flow rate or oxidant flow rate.

A sensor, which may be represented by sensor 14, may be configured to measure 36 the voltage across individual cells (or groups of cells) in the assembly 2. Step 37 comprises determining if the voltage across the fuel cell having the minimum voltage in the assembly 2 (termed "CVM" voltage) is below a threshold, which may be 0.3 V for a PEM, hydrogen, oxygen fuel cell. In general, step 37 comprises making an assessment of an electrical parameter of one or more or all of the fuel cells. If the CVM voltage or other electrical parameter is below the threshold this may be indicative of low performing fuel cells or over-heating. The controller may therefore be configured to reduce the current output or de-rate the load on the fuel cell assembly (step 38) of the assembly 2 to allow the fuel cell assembly to recover, as represented by the "–" side of control block 35. The de-rating of the load may be achieved in many ways such as by controlling the load or switching in alternative power sources. If the determined voltage is acceptable, the method proceeds with the incremental increase in current output shown in step 34.

The second process 30b comprises determining (step 40) the current output of and the voltage generated by the fuel cell assembly to determine the power output (by an integration step 41) of the fuel cell assembly 2. A current/voltage sensor represented by sensor 14 may be used. By accounting for the parasitic loads 42 of the fuel cell assembly, such as the driving of the control electronics and air or fuel compressors, the net power supplied to the first heater 12 may be determined at step 43.

Step 44 comprises using two measures to determine when to deactivate the first heater 12. In particular, the controller 15 may be configured to determine whether or not a specific quantity of power or energy has been supplied to the heater element 12 and whether or not a voltage above a voltage set point has been supplied to the first heater 12 for a predetermined time period. A joule counter, voltmeter or other sensor may be used. If both criteria are satisfied then the first heater 12 is turned off at step 45. Otherwise, the supply of power from the fuel cell assembly 2 to the first heater 12 is continued. It will be appreciated that a single measure or different combinations of measures may be used to determine when to deactivate the first heater 12. The measure(s) may be related to the energy required to melt a predetermined quantity of frozen coolant and warm the melted coolant within a volume surrounding the heater.

Step 45 also comprises the turning on of a second heater element 13 different to the first heater element 12.

The method remains in the above described first phase of operation until the first heater 12 has been turned off at step 45 and a measure of the temperature of the fuel cell assembly or of the exhaust gases leaving the fuel cell assembly has reached a temperature threshold, as shown by step 46. In this example the temperature threshold may be at least 10, 15, 20, or 25° C. or more. A temperature sensor 47 and decision block 48 represent the determination of whether or not the temperature threshold has been exceeded.

The criteria of step 46 may be different. For example, the transition between phase one and phase two operation modes may be based on when a predetermined quantity of liquid coolant is available for delivery to the fuel cell assembly, and/or a predetermined amount of electrical power having been supplied to the heater element and/or the heater element having been operating for predetermined time above a set-point voltage and/or a temperature of the fuel cell assembly or temperature of a fuel or oxidant flow through the fuel cell assembly is above a predetermined temperature.

Until both conditions checked for by step 46 are satisfied, the method proceeds to further control the ongoing third process 30c. The third process 30c may be initiated together with the first process 30a and second process 30b while being linked with the second process.

The third process 30c comprises at initial step 49 setting the oxidant flow rate to a predetermined minimum flow rate amount. The predetermined flow rate may be determined by experiment to ensure the fuel cell assembly can be cooled sufficiently prior to the release of coolant.

The method proceeds to determine the oxidant/air flow rate (step 50) required to achieve a particular, first, stoichiometric ratio of oxidant to fuel applied at inlets 4, 5. The controller 15 uses the current output of the fuel cell assembly 2 as determined by a sensor 51. The step 50 is configured to control the oxidant/air flow rate to maintain a high stoichiometric ratio, such as above 10 or above 15 or above 20. Step 50 represents controlling the compressors (not shown) to deliver the required oxidant flow rate to meet the desired stoichiometric ratio. Thus, the air flow greatly exceeds that required to be in stoichiometric balance with the amount of fuel provided to anode inlet 4. The air acts to cool the fuel cell assembly 18 until liquid coolant is available from the water module 3.

The above method, in phase one, thereby ensures that a particular quantity of energy is supplied to melt the frozen coolant such that a predetermined quantity of coolant is available before introducing it into the fuel cell assembly. This is advantageous as the temperature of the coolant can be increased and a quantity made available such that it does not re-freeze while travelling through conduits on its way to the assembly 2. Thus, the liquid coolant may be held in the coolant module 3 after being thawed until predetermined quantity of energy has been supplied to the heater element.

Once the conditions assessed at step 46 described above are satisfied, the method proceeds to a second phase. In general, in the second phase, water coolant is supplied to the fuel cell assembly 2 and the stoichiometric ratio is reduced. Further, the power output of the fuel cell assembly 2 is increased beyond the predetermined current output specified in step 34.

The method proceeds with providing for the delivery of coolant heated in the first phase to the fuel cell assembly 2, shown in steps 54a-c. The coolant may be delivered at a plurality of successively applied flow rates. It has been found to be advantageous to provide an initial, high flow rate followed by a lower flow rate. This has the benefit of starting the water pump 11 quickly (which may free any ice build-up and/or overcome any inertia), prime the water delivery conduits, and quickly provide the fuel cell assembly (which has been running without coolant or hydration liquid). For fuel cell assemblies that include a gallery, comprising an individual water storage volume adjacent to but upstream of an active area of each fuel cell, the high initial coolant flow rate can fill the galleries that then meter the coolant across the active area of the fuel cells.

In a first example, a high flow rate is provided initially for a first period, followed by a lower flow rate for a second period, followed by an even lower flow rate subsequently. Thus, an initial water injection profile of three, decreasing flow rates is used in this example. At least two decreasing flow rates is also preferred. The second flow rate may be determined on a predicted amount of coolant melted that remains in the water storage module versus the time required to complete the second phase. The effect of the water injection profile is to provide the coolant pump with an initial high torque value (step 54a), prime coolant supply conduits between the coolant storage module and the assembly (step 54b) and then operate the coolant pump at, or within a threshold of, a minimum coolant flow rate for maintaining the temperature of the assembly (step 54c).

The reduction in stoichiometric ratio is shown as step 55. In this example, the stoichiometric ratio is reduced to less than 15, or less than 10, or less than 5, for example. The flow rates for the fuel flow and oxidant flow are set accordingly to achieve the desired stoichiometric ratio.

FIG. 4 shows the continuation 60 of the second phase of the method performed by the controller(s) 15, 10. In the second phase the second heater 13 may be activated, but in this example it is activated in combination with the turning off of the first heater element in step 45. The provision of a plurality of heater elements 12, 13 is advantageous as the first heater elements can be positioned to melt a particular region of frozen coolant and a spaced heater element can melt a different region of frozen coolant in the coolant storage module 3. Thus, the operation of the first heater element in the first phase may have been selected such that enough energy was supplied to melt substantially all of the frozen coolant in the vicinity of the first heater element 12. This leaves a remaining quantity of frozen coolant in the module 3 for melting by the second heater element 13.

In the second phase, the hydrogen fuel inlet pressure applied to the anode inlet 4 is increased (step 61). This provides more fuel to the fuel cell assembly 2 allowing for increasing the power output of the assembly 2.

Step 62 shows a progressive increase in the power output of the fuel cell assembly to substantially 50% of the maximum power output of the fuel cell assembly. Thus, now that the fuel cell assembly has been provided with liquid coolant, it can operate more efficiently and its power output can be increased. While a 50% power output target has been used in this embodiment, up to 30%, 40%, 50%, 60% or 70% may be selected as the target output of the progressive increase step 62.

The controller(s) 15, 10 may be configured to determine the amount of coolant that is supplied to the fuel cell assembly 2, as shown at step 63. Thus, the cumulative quantity of water may be monitored.

The second heater 13 is provided with power from the fuel cell assembly such that it heats the coolant in the module 3 until a predetermined quantity of coolant has been thawed. This may be determined by measuring the amount of energy or power supplied to the heater element 13 and/or monitoring the amount of time a voltage above a set-point has been applied to the heater element 13. Step 64 uses two criteria to determine when to deactivate the second heater 13. In particular, the controller 15, 10 may be configured to determine whether or not a specific quantity of power or energy has been supplied to the heater element 13 and whether or not a voltage above a voltage set point has been supplied to the second heater 13 for a predetermined time period. A joule counter and voltmeter or other sensor may be used. If both criteria are satisfied then the second heater 13 is turned off at step 65. The controller 15, 10 has then completed phase two of the "frozen coolant start-up method" described above and proceeds to control the fuel cell system in accordance with a normal operation mode, shown as step 66. Otherwise, the supply of power from the fuel cell assembly 2 to the second heater 13 is continued.

During the progressive increase to the predetermined current output, the performance of the fuel cell system 1 may be measured to determine if the progressive increase to the predetermined current output can be maintained. The performance of the fuel cell system 1 may be measured after the predetermined current output has been reached. The controller 15, 10 uses a sensor to measure the voltage across the assembly and/ot the voltage across individual cells (or groups of cells) in the assembly 2. Step 67 comprises determining if the voltage across one of the fuel cells having the minimum voltage in the assembly 2 is below a threshold, which may be 0.3 V for a PEM, hydrogen, oxygen fuel cell. If the determined voltage is acceptable (i.e. above the threshold), the method proceeds with monitoring the water flow rate shown by loop 68.

If the voltage is below the threshold this may be indicative of low performing fuel cells or over-heating. Given that in the second phase water coolant is supplied to the fuel cell assembly 2, the method proceeds to assess the amount of coolant or rate of supply of coolant being supplied to the assembly 2 (step 69) before making changes to the flow rate or electrical output of the assembly.

Step 69 comprises assessing whether or not a predetermined maximum water coolant flow rate has been reached. If the maximum water coolant flow has been achieve (such as by reaching the maximum performance of the pump 11), the load of the fuel cell assembly 2 is reduced. This may be achieved by numerous means as will be known by those skilled in the art. The method continues to monitor the coolant injection rate at step 63.

If the water coolant flow rate is below the predetermined maximum mention above, the controller 15, 10 is configured to use a liquid coolant level sensor (not shown) in the coolant module 3 to determine if coolant is available (step 71). Alternatively the controller may estimate available water by integrating the amount of requested water flow by the controller. If coolant is not available, for example still frozen, then the method proceeds to step 70, described above. If coolant is available, the method proceeds to control (step 72) the coolant flow rate, by way of pump 11, from the rate set at the start of the second phase (step 54) to up to a flow rate threshold below that of the maximum performance of the coolant pump, for example. Thus, in general, the controller acts to increase the coolant flow rate up to a maximum of 15% or 10% or 20% greater (or other percentage) than the rate set at the start of the second phase (step 54). The method proceeds to step 63 in which monitoring or estimation of the amount of coolant injection rate is continued.

This two phase control scheme has been found to be particularly advantageous for starting the fuel cell system from a frozen or sub-four degree Celsius condition. The fuel cell system has been found to be able to operate at its full operating power within 2-3 minutes, perhaps sooner.

The control method discussed herein uses the voltage of the fuel cell having the minimum voltage in the assembly at various points to ensure reliable operation. Alternatively, a standard deviation of fuel cell voltage across the plurality of fuel cells in the assembly may be used and compared to a threshold value in some or all of the instances mentioned above. Alternatively, a rate of change of an average fuel cell voltage may be compared to a threshold. Alternatively, a cathode exhaust temperature or changes therein may be compared to a threshold. All of these measures may be considered to be indicators of fuel cell assembly performance.

Figure 5:
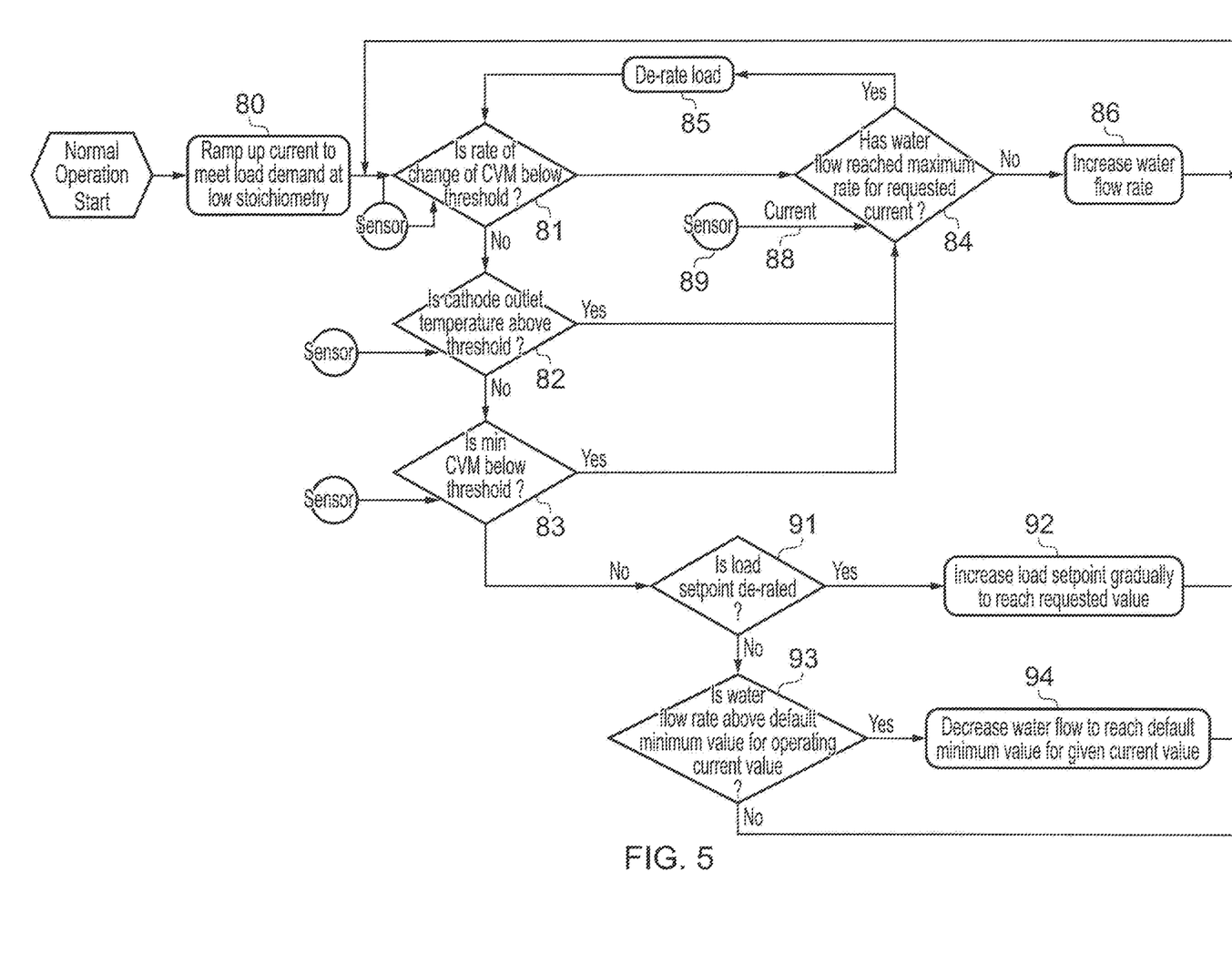
FIG. 5 shows a fourth flow chart illustrating a method of operation of the fuel cell system.

FIGS. 1 and 5 show a water injection controller 10 and illustrate a method for controlling the amount of coolant delivered to a fuel cell assembly 2 to provide efficient operation respectively. It is advantageous to deliver only enough coolant to the assembly 2 that is sufficient for keeping the temperature of the assembly 2 within acceptable limits. Thus, active control of the coolant flow rate during operation of the fuel cell assembly is advantageous and may lead to a particularly efficient system 1.

FIG. 1 shows a coolant injection controller 10 for a fuel cell system 1, the coolant injection controller 10 configured to actively control the flow of a coolant to a fuel cell assembly 2 for cooling and/or hydrating the fuel cell assembly 2 in response to a measure of fuel cell assembly performance from a sensor or array of sensors 14.

The measure of fuel cell assembly performance may comprises a measure, from sensor 14, of the electrical output of the fuel cell assembly 2, such as the current output or power output. In other embodiments the measure of fuel cell assembly performance comprises a measure of the temperature of a reactant flow through the fuel cell assembly such as the temperature at the cathode exhaust 7.

The coolant injection controller is configured to operate in at least two different modes based on an electrical output, such as the current output, of the fuel cell assembly 2. In this embodiment, the controller 10 has a first mode of operation if the current output of the assembly is below a predetermined threshold and a second mode of operation if the current output of the assembly is greater than the predetermined threshold. Alternatively, the selection of a mode of operation may be determined based on a coolant flow rate required by the fuel cell assembly such as a low flow rate (below a threshold) requires the first mode and a high flow rate (above the threshold) requires the second mode. The first and second modes of operation differ in how the pump 11 is controlled to deliver coolant to the fuel cell assembly 2. In particular, one or more of the flow rate, coolant injection duration and coolant injection rate pattern are altered depending on the mode of operation. Thus, different coolant injection profiles are provided.

In this embodiment, in the first mode of operation, the controller is configured to alternate between two different coolant flow rates by controlling the pump 11 accordingly. One of the flow rates may be zero and the other positive or they may both be positive (above zero). In this example, the controller provides for an injection of coolant at a flow rate of 80 cubic centimetres per minute for a duration of 25 seconds and a zero flow rate for 35 seconds and alternates between them periodically. It will be appreciated that further, different flow rates may be provided and the controller may cycle through them. The amount of water delivered may be more accurately monitored following this pattern as low flow rates may be difficult to measure or accurately maintain using the pump 11.

In the second mode of operation, the controller 10 is configured to provide a coolant injection profile in which the coolant flow rate is actively or progressively controlled in response to a measure of fuel cell assembly performance. The measure of fuel cell performance may be (or include) the current output described above or it may be a different measure of fuel cell performance, as discussed above.

Thus, the controller 15 may provide closed loop feedback to control the coolant flow rate in response to the measure of fuel cell assembly performance. The measure of fuel cell performance may utilise multiple criteria. For example, one or more of minimum fuel cell voltage (CVM voltage) of the fuel cells in the assembly 2, rate of change of assembly voltage or minimum fuel cell voltage or average fuel cell voltage, standard deviation (or changes of) of fuel cell voltage, cathode exhaust temperature 7 or other parameters. In particular, the measure of fuel cell performance comprises a measure that is indicative of over-heating of the fuel cell assembly 2 and/or saturation of the fuel cell assembly 2 with coolant.

In one example, if the coolant flow rate reaches a maximum threshold rate during the active closed loop control feedback, the controller is configured to reduce the electrical power output of the fuel cell assembly 2 by reducing the current generated by the stack.

Turning to FIG. 5, this flow chart indicates the start of "normal operation", which may correspond to the previously described method reaching step 66. In this example, the controller 15 is configured to determine absolute values and/or changes in CVM voltage and cathode exhaust 7 temperature to actively control the coolant flow rate, such as by instructing/powering the pump 11.

Step 80 comprises setting a desired output current from the fuel cell assembly and an oxidant/fuel stoichiometric ratio. In this example, a stoichiometric ratio of less than that of step 55. Step 81 comprises determining if the rate of change in the CVM voltage is below a CVM rate threshold value. If not, the method proceeds to assess (step 82) whether or not the cathode exhaust temperate 7 is above a temperature threshold. If not, the method proceeds to assess (step 83) whether or not the CVM voltage is below a CVM threshold.

If any of these three assessments (steps 81, 82, 83) of fuel cell performance are true, then the method proceeds to step 84 in which the controller 15 assesses whether a greater water coolant flow rate is available. The availability of a greater water flow rate may be determined by virtue of pump performance reaching an upper limit and or upper operating limit and/or water availability in the module 3, for example. A measure 88 of current output from the fuel cell assembly 2 is utilised from a current sensor 89. The controller 15, in step 84, thus determines if the current coolant flow rate is at a maximum for the particular electrical current output of the fuel cell assembly. This may comprise consultation of a look-up table or the like, to determine the maximum coolant flow rate for a particular current output.

If an increase in coolant rate is not available, the controller 10 is configured to reduce or de-rate the load (step 85) on the fuel cell assembly 2. Any reduction in the load are stored in memory so that the load can be increased once the fuel cell assembly is performing well.

If coolant is available (and therefore water flow rate is not at its maximum) the controller 15 is configured to increase the rate at which coolant is delivered to the assembly 2 (step 86). The controller then returns to method step 81.

The method then proceeds to assess the indicators of fuel cell assembly performance shown at steps 81, 82, and 83.

If the controller 15 determines that the performance of the fuel cell assembly 2 is within acceptable limits, which is concluded based on the steps 81, 82 and 83 returning false results, the method proceeds to step 91 to determine if the load set point has been previously decreased (as in step 85). As mentioned above, a memory may store this information. If the load has been decreased previously it is increased progressively over an extended time period (or at a predetermined rate, which may be experimentally determined), as shown at step 92. The method returns to step 81 to monitor the fuel cell assembly performance once again.

If the load set point has not been decreased previously the method proceeds to step 93. The controller 15 checks if the water coolant flow rate is above a default minimum threshold (such as increased above the desired minimum in step 86) for the particular current output the fuel cell assembly is operating at. Thus, a sensor may determine the current output and a look-up table or the like may be consulted to determine the desired minimum coolant flow rate. If the water coolant threshold is not exceeded the method returns to the start at step 81. If the water coolant threshold is above the predetermined default minimum value, the controller 15 is configured to decrease the water flow rate slowly (at a predetermined rate, which may be determined experimentally), as shown by step 94. The method proceeds to step 81, where the fuel cell assembly performance is checked.

In general, for each desired output current of the fuel cell assembly a minimum coolant flow rate and a maximum coolant flow rate may be set (such as experimentally) and the controller may be configured to maintain the coolant flow rate at the predetermined minimum coolant flow rate unless a measure of the performance of the fuel cell assembly (such as provided by steps 81-83) indicates that the water flow rate needs to be increased. The water flow rate will only be increased up to the predetermined maximum coolant flow rate for any given fuel cell assembly output current.

It will be appreciated that each of the individual steps disclosed in the above examples perform an important role in the efficient operation of a fuel cell assembly. Accordingly, each individual step may form an optional aspect of the invention as claimed.

The invention claimed is:

1. A coolant injection controller for a fuel cell system, comprising:
    a coolant injection controller configured to actively control the flow of a coolant to a fuel cell assembly for cooling and/or hydrating the fuel cell assembly in response to a measure of fuel cell assembly performance;
    wherein the coolant injection controller is configured to provide for a first mode of operation if the measure of fuel cell assembly performance is below a predetermined threshold and a second mode of operation if the measure of fuel cell assembly performance is above the predetermined threshold, the first and second modes having different coolant injection profiles; and,
    wherein, in the first mode of operation, the coolant injection profile provides for control of the flow of coolant by alternating between at least two different injection flow rates such that electrical power is provided to a heater element for heating a predetermined quantity of coolant for delivery to said fuel cell assembly, and
    wherein the heater element is located in a coolant storage module and configured to heat, during the first mode, frozen coolant such that the predetermined quantity is thawed for the delivery.

2. The coolant injection controller according to claim 1, in which the measure of fuel cell assembly performance comprises a measure of the electrical output of the fuel cell assembly.

3. The coolant injection controller according to claim 1, in which the measure of fuel cell assembly performance comprises one or more of a measure of the temperature of a cathode fluid flow through the fuel cell assembly, anode fluid flow through the fuel cell assembly and a coolant supplied to or exhausted from the fuel cell assembly, minimum fuel cell voltage of an individual fuel cell or group of fuel cells in the plurality of fuel cells that form the fuel cell assembly, a standard deviation in fuel cell voltage of a plurality of fuel cells that form the fuel cell assembly and a rate of change in minimum fuel cell voltage of an individual fuel cell or group of fuel cells in the plurality of fuel cells that form the fuel cell assembly.

4. The coolant injection controller according to claim 1, in which, in the second mode of operation, the controller is configured to provide a coolant injection profile in which the coolant flow rate is progressively controlled in response to a measure of fuel cell assembly performance.

5. The coolant injection controller according to claim 4, in which the controller is configured to provide closed loop feedback to control the coolant flow rate in response to a measure of fuel cell assembly performance.

6. The coolant injection controller according to any of claim 4, in which the controller is configured to progressively control the coolant flow rate based on a measure of the temperature of the fuel cell assembly.

7. The coolant injection controller according to claim 1, in which the controller is configured to, in response to the coolant flow rate having reached a maximum threshold rate, reduce the electrical power output of the fuel cell assembly or decrease the load powered by the fuel cell assembly.

8. A computer program product including instructions for execution on a computing device having a processor and memory for performing the method of:
    actively controlling the flow of a coolant to a fuel cell assembly for cooling and/or hydrating the fuel cell assembly in response to a measure of fuel cell assembly performance, and providing for a first mode of operation if the measure of fuel cell assembly performance is below a predetermined threshold; and,
    providing a second mode of operation if the measure of fuel cell assembly performance is above the predetermined threshold; the first and second modes having different coolant injection profiles; and,
    wherein in the first mode of operation, the coolant injection profile provides for control of the flow of coolant by alternating between at least two different injection flow rates such that electrical power is provided to a heater element for heating a predetermined quantity of coolant for delivery to said fuel cell assembly, and
    wherein the heater element is located in a coolant storage module and configured to heat, during the first mode, frozen coolant such that the predetermined quantity is thawed for the delivery.

9. A method for controlling a fuel cell system comprising the step of:
    actively controlling the flow of a coolant to a fuel cell assembly for cooling and/or hydrating the fuel cell assembly in response to a measure of fuel cell assembly performance, and providing for a first mode of operation if the measure of fuel cell assembly performance is below a predetermined threshold and a second mode of operation if the measure of fuel cell assembly performance is above the predetermined threshold, the first and second modes having different coolant injection profiles; and,
    wherein, in the first mode of operation, the coolant injection profile provides for control of the flow of coolant by alternating between at least two different injection flow rates such that electrical power is provided to a heater element for heating a predetermined quantity of coolant for delivery to said fuel cell assembly, and
    wherein the heater element is located in a coolant storage module and configured to heat, during the first mode, frozen coolant such that the predetermined quantity is thawed for the delivery.

* * * * *